United States Patent [19]

Ohuchi et al.

[11] Patent Number: 4,806,749
[45] Date of Patent: Feb. 21, 1989

[54] OPTICAL COORDINATE SYSTEM INPUT DEVICE

[75] Inventors: Junichi Ohuchi; Kazuo Hasegawa; Hiroaki Sasaki, all of Furukawa, Japan

[73] Assignee: Alps Electric Co., Ltd., Japan

[21] Appl. No.: 102,424

[22] Filed: Sep. 29, 1987

[30] Foreign Application Priority Data

Dec. 22, 1986 [JP] Japan .................................. 61-197863

[51] Int. Cl.$^4$ .............................................. G01V 9/04
[52] U.S. Cl. .................................... 250/221; 340/712; 341/5; 341/13
[58] Field of Search ............................ 250/221, 222.1; 340/365 P, 706, 707, 555–557, 712

[56] References Cited

U.S. PATENT DOCUMENTS

| | | | |
|---|---|---|---|
| 4,243,879 | 1/1981 | Carroll et al. | 250/221 |
| 4,313,109 | 1/1982 | Funk et al. | 250/221 |
| 4,645,920 | 2/1987 | Carroll et al. | 250/221 |
| 4,652,741 | 3/1987 | Golborne | 250/221 |
| 4,725,726 | 2/1988 | Hasegawa et al. | 250/221 |

Primary Examiner—Edward P. Westin
Attorney, Agent, or Firm—Guy W. Shoup; Paul J. Winters; Brian D. Ogonowsky

[57] ABSTRACT

An optical coordinate system input device including multiple opposed pairs of light emitting elements and light receptor elements which are sequentially selectively activated via a switching circuit, a variable impedance circuit connected in series with the light receptor elements to form a voltage divider, and an impedance detection circuit for detecting a low impedance of the light receptor elements caused by ambient light, wherein a detection signal from the impedance detection circuit lowers the impedance of the variable impedance circuit to increase the sensitivity of the input device to small changes in impedance of said light receptor elements upon detection of a light signal, emitted by said light emitting elements, by said light receptor elements in presence of strong ambient light.

4 Claims, 4 Drawing Sheets

OPTICAL COORDINATE SYSTEM INPUT DEVICE

FIELD OF THE INVENTION

This invention relates to an optical coordinate system input device configured to prevent erroneous detection caused by external turbulent light, etc., and more particularly to an improved optical coordinate system input device having an improved operative dynamic range of its light receptor.

BACKGROUND OF THE INVENTION

Various prior art optical detection arrangements are disclosed in U.S. Pat. Nos. 3,478,220, 3,704,396, 3,742,222, 3,746,863, 3,764,813, 3,860,754, 3,970,846, 4,122,438, 4,198,623, 4,205,304, 4,245,244, 4,266,124, 4,267,443, 4,301,447, 4,313,109, 4,384,201, 4,563,578, 4,585,940, 4,591,710 and others.

Among these prior art technologies, U.S. Pat. Nos. 4,245,244, 4,585,940 and some others are configured to prevent erroneous operation caused by external light.

A conventional type of optical coordinate system input device which is affected by external light is described in general below and with reference to FIG. 4.

An optical coordinate system input device in general is disposed at the front face of a CRT display, LCD or other image display apparatus and activated to supply a coordinate system instruction to a computer. A number of pairs of light emitting elements and light receptor elements are opposed to each other along the outer peripheral margins of the screen of the CRT display, etc., and the light emitting elements and light receptor elements are selectively scanned to detect any interruption of a light signal by an operators finger or other blocker during the scanning to obtain a coordinate system signal.

FIG. 4 is a circuit diagram of prior art optical coordinate system in which a number of light emitting diodes L1 through Ln are placed on two adjacent margins of the front face outer periphery of a CRT or other image display apparatus. Photo transistors PT1 through PTn, employed as the light receptor elements, are placed on the other two adjacent margins and opposed to the light emitting diodes L1 through Ln. Horizontally arranged pairs of light emitting diodes (L1 through Lm) and photo transistors (PT1 through PTm) form X axes of the coordinate system, and vertically arranged pairs of light emitting diodes (Lm+1 through Ln) and photo resistors (PTm+1 through PTn) form Y axes of the coordinate system. Cathodes of the light emitting diodes L1 through Ln and emitters of the photo transistors PT1 through PTn are all connected to ground. Anodes of the light emitting diodes L1 through Ln are connected to respective ends of normally opened switching elements SL1 through SLn which have the other ends connected in common to the emitter of a driving transistor Q1. Switching elements SL1 through SLn together form first switching circuit 1. The collectors of the photo transistors PT1 through PTn are connected to respective ends of normally opened switching elements S1 through Sn which have other ends connected in common to a waveform shaper 2. Switching elements S1 through Sn together form second switching circuit 3.

In the waveform shaper 2, a common junction p of the switching elements S1 through Sn is connected to the base of a transistor Q2 via a capacitor C1. The emitter of the transistor Q2 is connected to ground, and the collector thereof is connected to the driving power source V via series-connected resistors R1 and R2. A junction q of resistors R1 and R2 is connected to ground via a pulse bypass capacitor C2, and also connected to the common junction p of the switching elements S1 through Sn via a resistor R4. The base of the transistor Q2 is connected to the driving power source terminal V via a resistor R5.

An output from the waveform shaping circuit 2 is applied to an amplifier 4 through the collector of the transistor Q2, adequately amplified there and subsequently applied to a microprocessor (hereinafter called CPU) 5.

The CPU 5 applies a switching signal a to first and second switching circuits 1 and 3 to sequentially switch switching elements SL1 through SLn and S1 through Sn to sequentially sample the light transmitted between opposing phototransistor/light emitting diode pairs. Additionally, the CPU 5 applies a driving signal b to the base of the driving transistor Q1 which, in response to this, provides three or more current pulses through each of the light emitting diodes L1 through Ln as each opposing pair of the light emitting diodes L1 through Ln and photo transistors PT1 through PTn is selected by CPU 5. Thereby, a selected one of the light emitting diode L1 through Ln emits several pulsating flashes of light. The collector of the driving transistor Q1 is connected to the driving power source terminal V via an appropriate resistor.

With this arrangement, a voltage exists at junction p which is determined by the driving power source terminal V divided by the resistors R1 and R4 in series with the impedance of a selected one of photo transistors PT1 through PTn. If the voltage at the junction p does not change, the transistor Q2 is in conduction, and no output is applied to the amplifier circuit 4.

When a selected one of the photo transistors PT1 through PTn receives pulsating light signals produced by a selected one of the light emitting diodes L1 through Ln, the impedance of the photo transistor decreases due to the light reception, and the divided voltage at the junction p decreases with the impedance of the phototransistor. Therefore, the transistor Q2 is pulsatingly conductive or nonconducted and applies a pulsating output to the amplifier circuit 4.

If the light emitted from light emitting diodes L1 through Ln is not blocked by a finger or other obstacle, the repetitive pulse signals at the collector of transistor Q2 are supplied to amplifier circuit 4, amplified, and supplied to the CPU 5. In contrast, if the light signal is blocked, no repetitive pulse signal is supplied from the amplifier circuit 4 to the CPU 5. The CPU 5 is then able to calculate the x-y coordinates of a light blocking obstacle based on absence or presence of the repetitive pulse signal applied to the CPU 5.

In the above-described prior art optical coordinate system input device, the impedance of photo transistors PT1 through PTn decreases to a substantial saturated state upon entrance of strong external turbulent light, and the divided voltage at the junction p decreases responsively. As a result, with high ambient light, the impedance of the phototransistors PT1 through PTn can only decrease a small amount upon receipt of light signals from light emitting diodes L1 through Ln before becoming saturated. Therefore, the voltage change of the divided voltage at the junction p is too small to invert the transistor Q2 to non-conduction, and a false output is applied to the amplifier circuit 4. As a result, the CPU 5 erroneously judges that the light signal is blocked and an erroneous coordinate system signal is produced.

OBJECT OF THE INVENTION

It is therefore an object of the invention to provide an optical coordinate system input device which does not allow for erroneous detection caused by external turbulent light.

SUMMARY OF THE INVENTION

To attain the object, the invention is based on an optical coordinate system input device including multiple pairs of opposed light emitting elements and light receptor elements which are sequentially selectively driven through a switching circuit. A light blocking obstacle is detected from a change in the impedance of a selected receptor element due to the reduced amount of light received by the receptor element from the opposed light emitting element, a coordinate system signal is obtained based on a signal responsive to non-reception of the light signal. The inventive device is characterized in the use of a variable impedance circuit connected in series with a selected light receptor element, and the use of an impedance detecting circuit for detecting a voltage drop responsive to the impedance of the light receptor element and for producing a detection signal used to drop the impedance of the variable impedance circuit.

Further, in an optical coordinate system input device configured to obtain a coordinate system signal by effecting an operation in a microprocessor based on a signal responsive to non-reception of the said light signal by the selected light receptor element, a variable impedance circuit is interposed in series with the light receptor element, a impedance detection circuit is provided for converting a voltage responsive to the impedance of the light receptor element into a digital value, a digital output from the impedance detection circuit is operated in the microprocessor, and the impedance of the variable impedance is dropped by a control signal produced by the microprocessor in response to a drop of the impedance of the light receptor element.

Since the variable impedance circuit is interposed in series with the light receptor element, and the impedance detection circuit is provided for detecting an impedance drop of the light receptor element caused by ambient light so that the detection signal of the impedance detection circuit drops the impedance of the variable impedance circuit, the impedance of the variable impedance circuit is dropped when strong ambient light hits the light receptor elements. Hence, due to the lowered series resistance, a small impedance change before saturation of the light receptor element in receipt of the light signal relative to the total series resistance exhibits a large divided voltage change, and reception of the light signal is detected despite the presence of strong ambient light.

DETAILED DESCRIPTION

Figure 1:
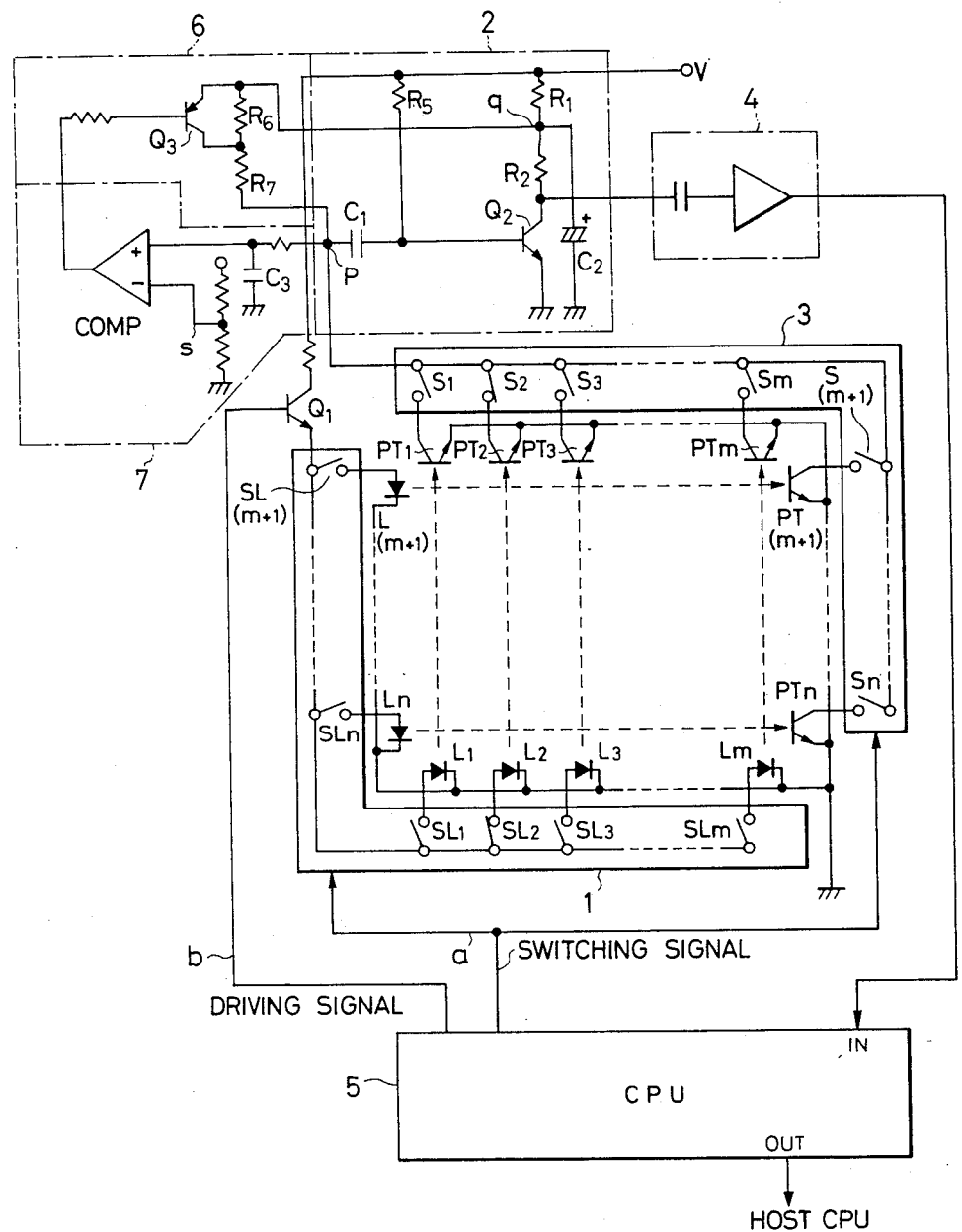
FIG. 1 is a circuit diagram showing a first embodiment of the invention.

A first embodiment of the invention is described below with reference to FIG. 1, which is a circuit diagram of an optical coordinate system input device according to the invention. In FIG. 1, the same circuit blocks or elements as those of FIG. 4 are designated by the same reference numerals, and their redundant explanation is omitted here.

Figure 4:
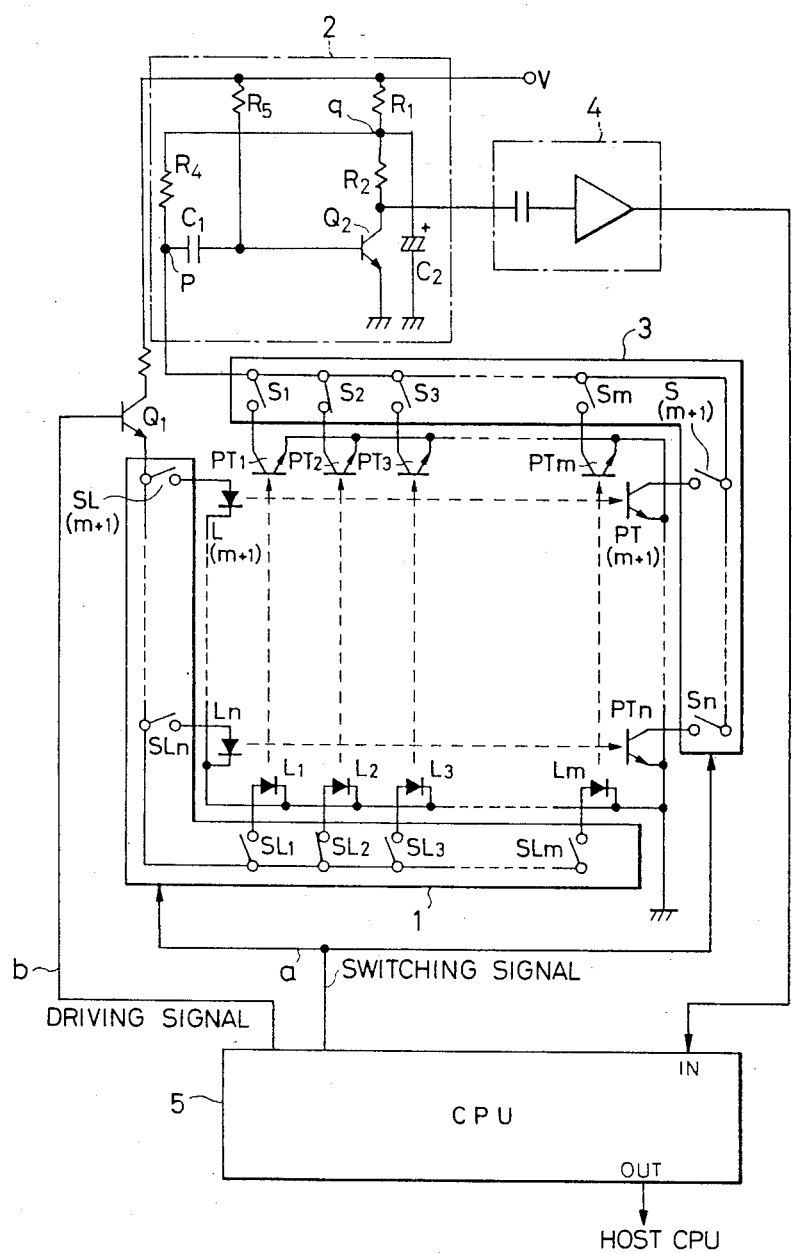
FIG. 4 is a circuit diagram of a prior art device.

In FIG. 1, differences from FIG. 4 are as follows.

A variable impedance circuit 6 is interposed in lieu of the resistor R4 of FIG. 4 interposed in series between the common junction p of the photo transistors PT1 through PTn and the driving voltage terminal V. Junction q of the resistors R1 and R2 is connected to the junction p via series-connected resistors R6 and R7, and a transistor Q3 is connected in parallel with the resistor R6. The sum resistance of the resistors R6 and R7 is identical to the resistance of the resistor R4 of FIG. 4.

In an impedance detection circuit 7, the junction p is connected to a plus input terminal of a comparator COMP via an adequate resistor, and the plus input terminal is connected to ground via a smoothing capacitor C3. A reference voltage S is applied to the minus input terminal of the comparator COMP. The output terminal of the comparator COMP is connected to the base of the transistor Q3 of the variable impedance circuit 6.

Using this arrangement, if the ambient light is weak, the reference signal S is lower than the divided voltage appearing at the junction p, causing a high voltage signal to be produced from the comparator COMP, and the transistor Q3 is in non-conduction. In this configuration, the impedance of the photo transistors PT1 through PTn is relatively large, and large the impedance changes are incurred upon reception of the light signal. As a result, the voltage at the junction p undergoes a large change and light signal reception is detected in the same manner as in the prior art optical coordinate system input device of FIG. 4.

If the ambient light is strong, the impedance of the photo transistors PT1 through PTn drops, and the divided voltage at the junction p which is the end-to-end voltage of the photo transistors PT1 through PTn, drops below the reference voltage S. Responsively, a low voltage signal is supplied as a detection signal from the comparator COMP, and the transistor Q3 is made to conduct. Therefore, the impedance of the variable impedance circuit 6 is changed to the impedance of the resistor R7 alone from the series connection of the resistors R6 and R7 and hence drops, so that the voltage division ratio with respect to the photo transistors PT1 through PTn is improved to elevate the divided voltage at the junction p. As a result, the impedance change before saturation of the photo transistors PT1 through PTn in receipt of the light signal appears as a large change of the divided voltage at the junction p, and the range of detectable light signal reception is extended. The capacitor C3 is used to prevent erroneous operation of the comparator COMP upon a voltage change at the junction p caused by impedance switching of the variable impedance circuit 6 or light signal reception.

Figure 2:
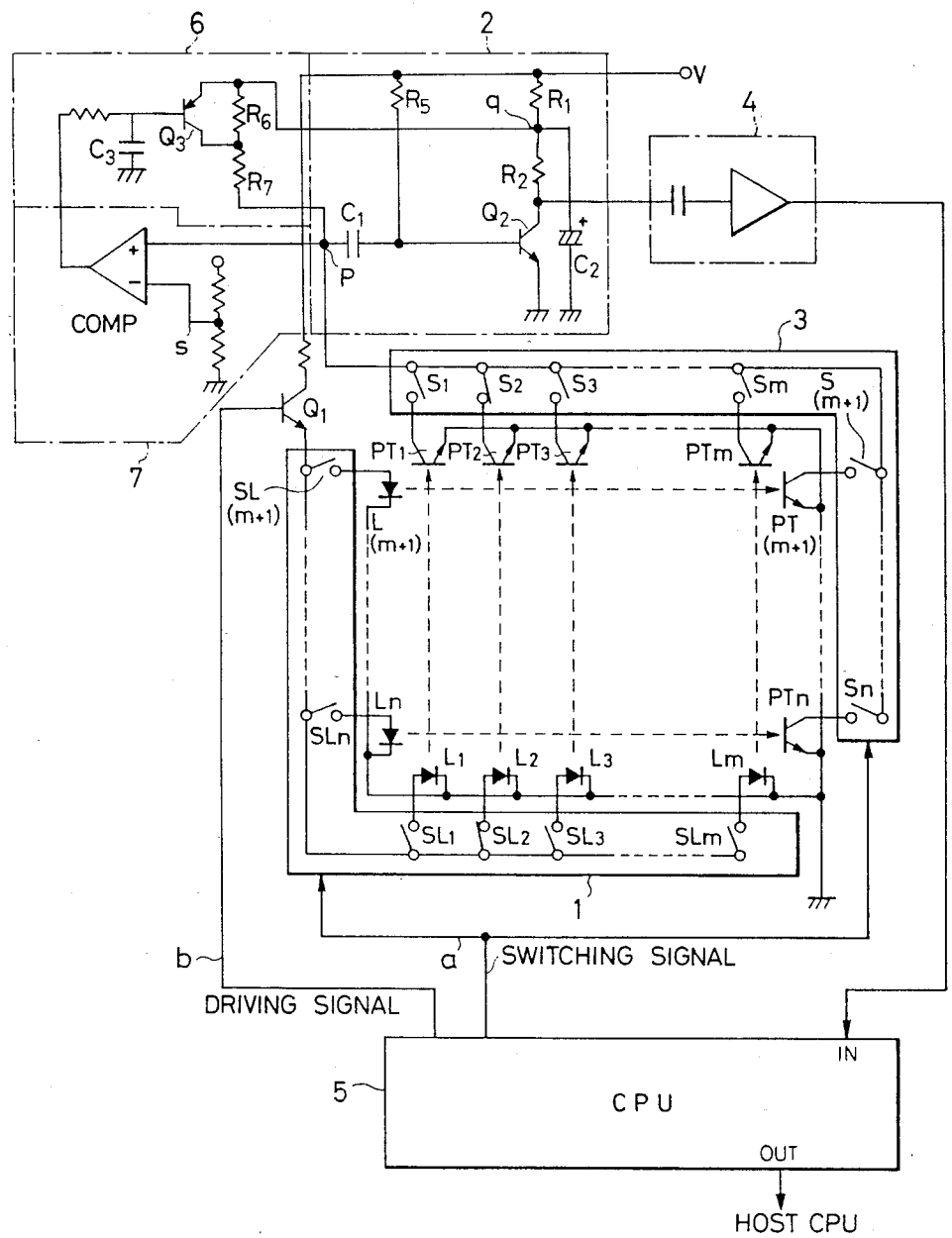
FIG. 2 is a circuit diagram showing a second embodiment of the invention.

FIG. 2 is a circuit diagram of a second embodiment of an optical coordinate system input device according to the invention. In FIG. 2, the same circuit blocks and elements as those of FIGS. 1 and 4 are designated by the same reference numerals, and their redundant explanation is omitted here.

The arrangement of FIG. 2 is different from that of FIG. 1 in that the capacitor C3 interposed between the plus input terminal of the comparator COMP and the ground connection in FIG. 1 is omitted, and the capacitor C3 is interposed between the base of the transistor Q3 and the ground connection. The capacitor C3 smoothes the output of the comparator COMP and subsequently applies it to the transistor Q3 to prevent any possible erroneous operation caused by a voltage change at the junction p upon impedance switching of the variable impedance circuit 6 or upon light signal reception.

In the above-described embodiment, impedance switching of the variable impedance circuit 6 is effected by a switching operation between conduction and non-conduction of the transistor Q3. However, the impedance detection circuit 7 may be configured to produce a signal responsive to the end-to-end voltage of the photo transistors PT1 through PTn so that the impedance of the variable impedance circuit 6 is continuously adjusted. It is satisfactory if the impedance detection circuit 7 is supplied with a voltage responsive to the impedance of the photo transistors PT1 through PTn.

Figure 3:
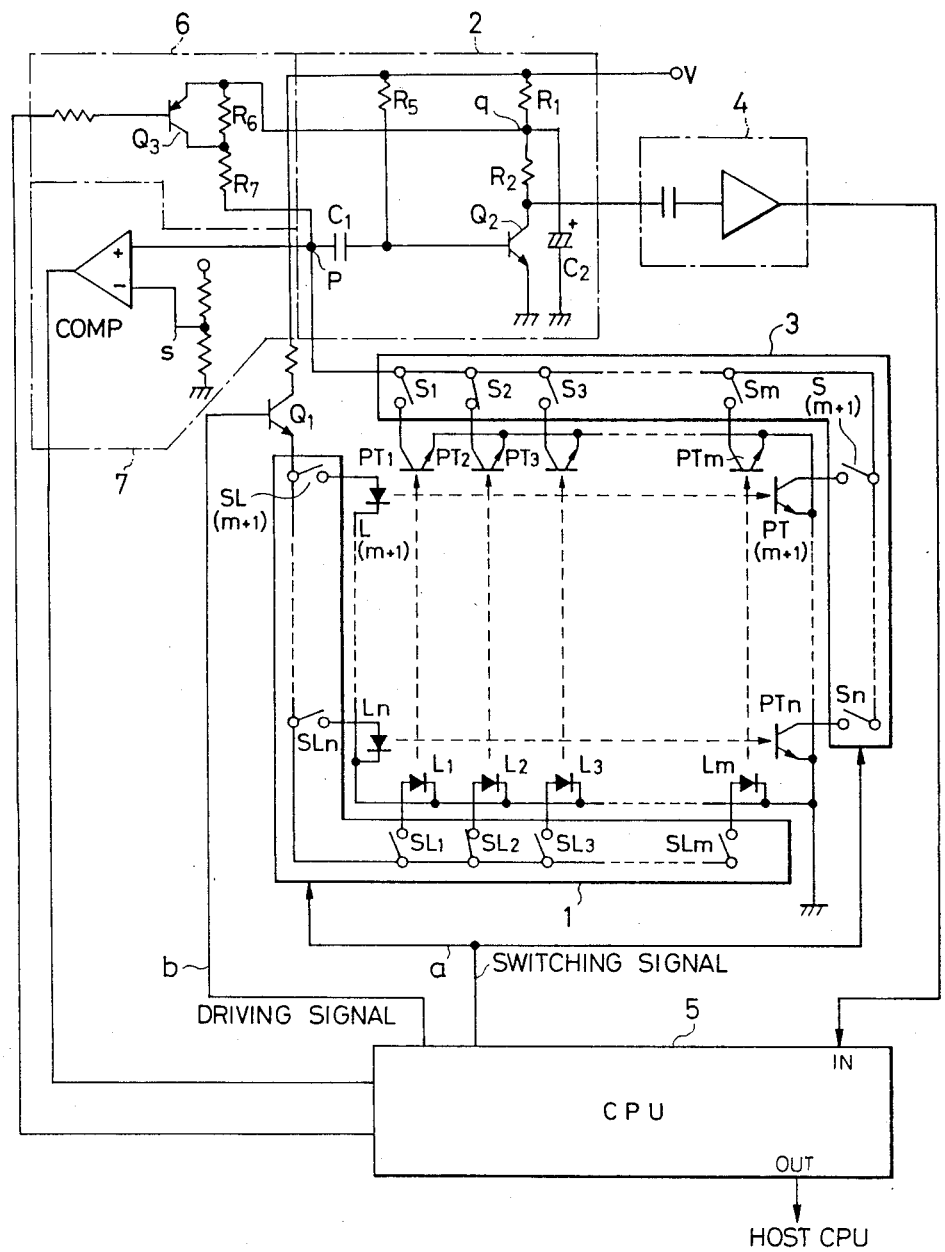
FIG. 3 is a circuit diagram showing a third embodiment of the invention.

FIG. 3 is a circuit diagram of a third embodiment of an optical coordinate system input device according to the invention. In FIG. 3, the same circuit blocks and elements as those of FIG. 4 are designated by the same reference numerals, and their redundant explanation is omitted here.

In FIG. 3, differences from FIG. 4 are as follows.

A variable impedance circuit 6 is interposed in lieu of the resistor R4 of FIG. 4 interposed in series between the common junction p of the photo transistors PT1 through PTn and driving voltage terminal V. In the variable impedance circuit 6, a junction q of the resistors R1 and R2 is connected to the junction p via series-connected resistors R6 and R7, and a transistor Q3 is connected in parallel with the resistor R6. The sum resistance of the resistors R6 and R7 is identical to the resistance of the resistor R4 of FIG. 4.

In an impedance detection circuit 7, the junction p is connected to a plus input terminal of a comparator COMP via an adequate resistor, and a reference voltage S is applied to the minus input terminal of the comparator COMP. An output of the comparator COMP is applied to the CPU 5, and a control signal from the CPU 5 is applied to the base of the transistor Q3 of the variable impedance circuit 6.

Using this arrangement, if the ambient light is weak, the reference signal S is lower than the divided voltage appearing at the junction p, causing a high voltage signal to be produced from the comparator COMP, and the CPU 5 gives a high voltage control signal to the transistor Q3 to establish non-conduction thereof. In this configuration, the impedance of the photo transistors PT1 through PTn is relatively large, and large impedance changes are incurred upon reception of the light signal. As a result, the voltage at the junction p undergoes a large change, and light signal reception is detected in the same manner as in the prior art optical coordinate system input device of FIG. 4.

If the ambient light is strong, the impedance of the photo transistors PT1 through PTn drops, and the divided voltage at the junction p drops below the reference voltage S. Responsively, a low voltage signal is produced from the comparator COMP, and the CPU 5 gives a low voltage control signal to cause transistor Q3 to conduct. Therefore, the impedance of the variable impedance circuit 6 is switched to the impedance of the resistor R7 alone from the series connection of the resistors R6 and R7 and hence drops, so that the voltage division ratio with respect to the photo transistors PT1 through PTn is improved to elevate the divided voltage at the junction p. As a result, the change of impedance before saturation of the photo transistors PT1 through PTn in receipt of the light signal appears as a large change of the divided voltage at the junction p, and the range of detectable light signal reception is extended. Precise detection of an impedance drop of the photo transistors PT1 through PTn caused by ambient light is possible while any pair of the light emitting diodes L1 through Ln and photo transistors PT1 through PTn is selected and when the light emitting diodes L1 through Ln do not emit light in absence of the driving signal b to the driving transistor Q1.

The above-described embodiment is configured so that the comparator COMP compares the voltage at the junction p with the reference voltage S, and the impedance detection circuit 7 converts the voltage responsive to the impedance of the photo transistors PT1 through PTn into two digital values. However, an analog-to-digital conversion circuit, etc. may be used to convert the voltage at the junction p into multiple digital values and apply them to the CPU 5. Further, the signal applied to the impedance detection circuit 7 is not limited to the voltage appearing at the junction p, but may be any other voltage responsive to the impedance of the photo transistors PT1 through PTn. Additionally, the above-described embodiment is configured so that impedance switching of the variable impedance circuit 6 is effected by switching operation between conduction and non-conduction of the transistor Q3. However, it may replaced by an arrangement that the impedance of the variable impedance circuit 6 is continuously adjusted by a control signal produced by the CPU 5.

The various embodiments are heretofore described as including a resistor and transistor in parallel. However, providing multiple parallel circuits in series to increase the variation of the impedance in accordance with the circumstances of the use of the device is an obvious and routine design choice for an artisan in this technical field.

As described above, the optical coordinate system input device according to the invention expands the detectable range of light signal reception up to stronger ambient light, and hence prevents erroneous detection caused by ambient light.

What is claimed is:

1. An optical coordinate system input device comprising:
   multiple opposed pairs of light emitting elements and light receptor elements;
   selection means associated with respective said pairs of light emitting elements and light receptor elements to sequentially activate same;
   an impedance detection circuit for detecting an impedance of a selected one of said light receptor elements, said impedance being related to a level of ambient light; and
   a variable impedance circuit, coupled in series with a selected light receptor element, whose impedance is controlled in response to an output signal from said impedance detection circuit, wherein a predetermined level of ambient light, reducing said impedance of said selected light receptor element, causes said impedance detection circuit to control said variable impedance circuit to reduce the series impedance of said selected light receptor element and said variable impedance circuit.

2. An optical coordinate system input device of claim 1 wherein said variable impedance circuit includes a resistor and a transistor connected in parallel, and wherein said impedance detection circuit is configured to detect a voltage at a terminal of a selected one of said light receptor elements, and said impedance detection circuit includes a comparator for comparing said voltage at a terminal of a selected one of said light receptor elements with a reference voltage, said comparator providing said output signal of said impedance detection circuit.

3. An optical coordinate system input device of claim 1 further including a means for converting said output signal from said impedance detection circuit into multiple digital values; and an analog conversion circuit for converting said digital values into an analog value, wherein impedance of said variable impedance circuit is responsive to said analog value.

4. An optical coordinate system input device of claim 3 wherein said output signal of said comparator is one of two digital values.

* * * * *